United States Patent [19]

Hagedorn et al.

[11] 4,074,996
[45] Feb. 21, 1978

[54] METHOD OF AND APPARATUS FOR BENDING GLASS SHEETS

[75] Inventors: Floyd T. Hagedorn, Oregon; Donald D. Rahrig; Robert G. Revells, both of Toledo, all of Ohio

[73] Assignee: Libbey-Owens-Ford Company, Toledo, Ohio

[21] Appl. No.: 709,332

[22] Filed: July 28, 1976

[51] Int. Cl.² ............................................. C03B 23/02
[52] U.S. Cl. ........................................ 65/106; 65/273; 65/274; 65/275; 65/290
[58] Field of Search ................. 65/106, 107, 273, 274, 65/275, 290, 291

[56] References Cited

U.S. PATENT DOCUMENTS

| 3,103,430 | 9/1963 | Jendrisak | 65/290 |
| 3,223,996 | 2/1966 | Cox et al. | 65/107 |
| 3,682,613 | 8/1972 | Johnson et al. | 65/291 |

FOREIGN PATENT DOCUMENTS

| 622,728 | 6/1961 | Canada | 65/291 |

Primary Examiner—Arthur D. Kellogg
Attorney, Agent, or Firm—Collins, Oberlin & Darr

[57] ABSTRACT

A method of and apparatus for bending glass sheets to relatively sharp angles. The apparatus includes a sectionalized primary press bending member having articulated end sections for sharply bending portions of a glass sheet about lines superheated by a radiant energy heat source located above the primary press member. A reciprocal brake bar is extended into engagement with the glass sheet along the heated focal line to assist the articulated press end sections in bending the glass. Clamping devices can be used in lieu of the brake bar to secure the heat-softened glass sheet to the press member shaping surface during bending. A supplemental press member, mounted above the primary press member, is provided with shaping elements having shaping surfaces complemental to the shaping surfaces of the primary press articulated end sections for pressing the glass end portions therebetween into conformity with these shaping surfaces.

25 Claims, 12 Drawing Figures

METHOD OF AND APPARATUS FOR BENDING GLASS SHEETS

BACKGROUND OF THE INVENTION

The present invention relates generally to the production of bent glass sheets and, more particularly, to an improved method of and apparatus for bending glass sheets to relatively sharp angles.

Bent sheets of glass are commonly used as glazing closures in vehicles and the like. The shapes of these glazing closures may vary widely and various techniques have been developed to bend them into increasingly complex shapes of curved configurations. Sometimes, however, it may be desirable to provide a generally vertically extending sharp bend in a windshield, a backlight or a sun roof in continuation of a bead or molding strip on the surface of the hood, deck lid or roof panel. Or, it may be desirable to form two or more sharp bends in either vertical or horizontal directions to effect wrap around of a windshield or backlight into the side surface of the roof line of the vehicle. Generally, the previously accepted conventional gravity sag and press bending techniques, which have admirably served their purposes in bending glass sheets to various complex and compound curvatures, have not lent themselves satisfactorily to the production of glass sheets having sharp, angular bends therein.

One sophisticated gravity sag technique successfully developed to produce sharply bent glass is provided by the glass bending methods disclosed and claimed in U.S. Pat. Nos. 3,762,903 and 3,762,904, assigned to the same assignee as the present invention, whereby an electrically conducting path is formed on at least one surface of the glass sheet along the line about which it is desired to sharply bend the sheet. The sheet is then supported on a suitable gravity mold structure and heated in a furnace to a temperature corresponding to the softening point of the glass, causing it to sag by gravity into conformance with the shaping surfaces of the mold while simultaneously passing an electric current through said path to heat the area of the glass sheet immediately adjacent said path to a temperature above the aforementioned softening point, causing said sheet to bend along said path to form the desired relatively sharp angle therein.

While the above-described, specially modified, gravity sag method has been successful, attempts to impart sharp bends to glass sheets by previously accepted press or mold bending procedures have not been successful because it is virtually impossible to heat the glass sheet to the elevated temperatures necessary for forming the sharp bends without introducing unacceptable distortion therein.

SUMMARY OF THE INVENTION

Therefore, it is a primary object of the present invention to provide a solution to the above problem by providing a new and improved press bending method of and apparatus for forming glass with relatively sharp bends and/or more complex curvatures than heretofore possible.

It is another object of this invention to provide the foregoing bending apparatus with novel features offering versatality in selectively producing angular or curved bends, as desired, in a glass sheet.

It is still another object of the present invention to provide the foregoing apparatus with a supplemental press member engaging only selected portions of the glass sheet to assure conformance thereof with the shaping surfaces of the primary press member.

It is yet another object of this invention to provide apparatus of the above character with an auxiliary bending tool to assure the formation of sharp bends in the glass sheet when desired.

It is further object of the present invention to provide the above apparatus with a clamping arrangement for maintaining the glass sheet marginal edge portions fixed against the mold shaping surface.

It is still a further object of this invention to provide the foregoing press apparatus with a radiant heating arrangement to superheat selective portions of the glass sheet along narrow lines about which it is desired to sharply bend the sheet.

The foregoing and other objects, advantages, and characterizing features of the present invention will become clearly apparent from the ensuing detailed description thereof considered in conjunction with the accompanying drawings wherein like reference numerals denote like parts throughout the various views.

DESCRIPTION OF THE PREFERRED EMBODIMENTS

Figure 1:
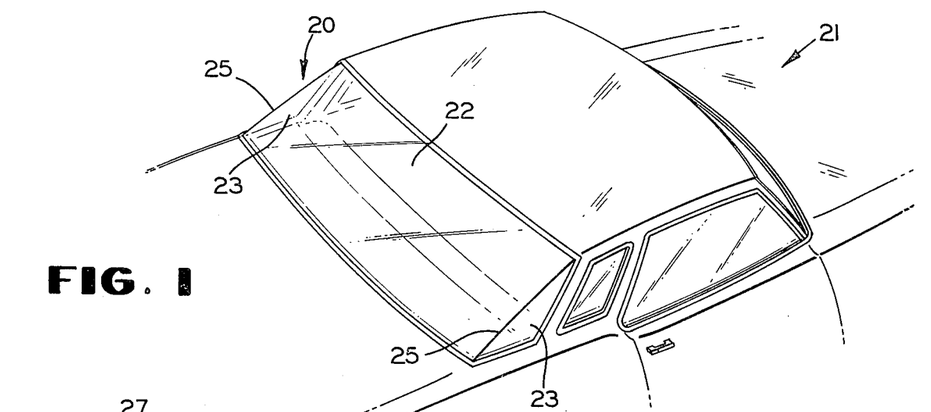
FIG. 1 is a perspective view of an automobile including a backlight comprised of a single sheet of sharply bent glass produced in accordance with the present invention.

Referring now in detail to the drawings, there is depicted in FIG. 1 a backlight 20 bent to the desired configuration in accordance with the method and apparatus of this invention and shown installed in an automobile 21 embodying recent styling features. The backlight 20 is comprised of a single glass sheet having a main body portion 22 and inturned opposite end portions 23 of generally triangular outlines. These opposite end portions 23 are bent at sharp angles about straight lines, indicated generally at 25, and extending from one longitudinal edge of the glass sheet to the other adjacent the opposite sides of the automobile. While it will be convenient to describe the method and apparatus of this invention in connection with the formation of a glazing closure comprised of a single sheet and having two transversely extending, sharp angular or V-shaped bends therein, it should be understood that the principles of this invention are equally applicable in the production of glass sheets having one or any number of angular bends in either a transverse or longitudinal direction and/or multiple layered sheets of glass, such as conventional laminated windshields, for example.

Figure 2:
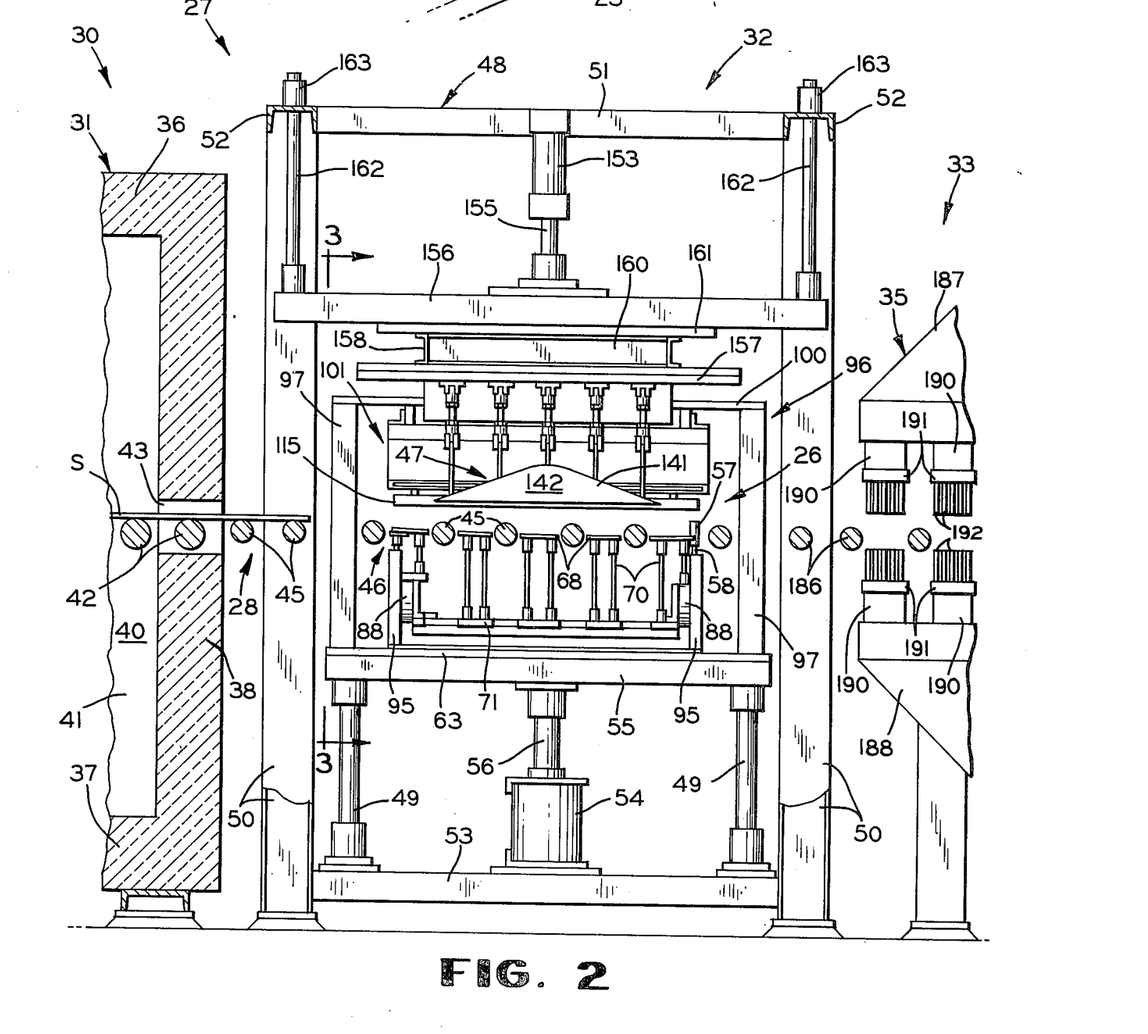
FIG. 2 is a side elevational view of a bending and tempering apparatus incorporating the novel features of the present invention.

Referring now in detail to the illustrated embodiment for carrying out this invention and forming the sharp bends in the finished product, there is shown in FIG. 2 a novel bending apparatus, generally designated 26, constructed in accordance with this invention and hereinafter more fully described, incorporated in a horizontal glass sheet bending and tempering apparatus, comprehensively designated 27. Apparatus 27 includes a continuous conveyor system 28 adapted to support a plurality of sheets S in a generally horizontal path through a heating station 30 having a furnace 31 for heating the sheets to their softening point or bending temperatures, a bending station 32 embodying the novel apparatus 26 of this invention for bending the heated sheets S to the desired shape, and a tempering station 33 having chilling means 35 for rapidly reducing the temperature of the bent sheets to produce the desired temper therein. While preferably the invention will be described in connection with the horizontal bending and tempering apparatus depicted in the drawings, it should be understood that the press bending apparatus 26 of this invention is not restricted to such a horizontal operation, but has utility in a vertical press bending operation or any environment utilizing a single or opposed press or mold member for shaping glass.

In the illustrated embodiment, the glass sheets S are heated in the furnace 31, which is of the tunnel-type having a top wall 36, a bottom wall 37, a rear end wall 38, and opposite side walls 40, all formed of a suitable refractory material and defining a heating chamber 41. The heating chamber 41 can be heated in any desired manner by suitable heating means, such as gas burners or electrical resistance elements for example (not shown) located in the top and side walls of furnace 31. Such heating means are suitably controlled by apparatus (also not shown) to obtain the desired temperature at various points in the heating chamber 41. The sheets S are carried through the heating chamber 41 of the furnace on a plurality of conveyor rolls 42, forming a part of the conveyor system 28, and extending transversely across the chamber 41 with their opposite ends projecting through the opposite walls 40 and suitably journalled in bearing blocks (not shown) located exteriorly of and along the side walls of furnace 31.

A plurality of glass sheets S are individually loaded on and supported in a generally horizontal plane on the longitudinally spaced conveyor rolls 42 at the entrance end of the furnace (not shown) and heated in a controlled manner to the desired bending temperature during their passage therethrough. Upon emerging through an opening 43 in the rear end wall 38 of furnace 31, the heated glass sheets S are transferred from conveyor rolls 42 onto a second series of spaced conveyor rolls 45, also part of the conveying system 28 and which are journalled at their opposite ends in suitable bearing blocks (not shown) located along and on opposite sides of the bending station 32. As shown in FIG. 2, the rolls 45 are smaller in diameter than the rolls 42 to define a larger space therebetween for a purpose hereinafter more fully described. The series of rolls 45 support the glass sheets S horizontally for movement into and within the bending station 32, before and after bending, and then convey them to the tempering station 33. While not restricted thereto, preferably the conveyor rolls 45 are of the contoured, pivotal type, such as those disclosed and claimed in U.S. Pat. No. 3,905,794, granted Sept. 16, 1975, and assigned to the same assignee as the present invention.

In accordance with this invention, the bending apparatus 26 consists essentially of a movable lower primary bending press or mold member 46 and a substantially stationary upper, supplemental bending press or mold member 47, all suitably mounted within a rigid framework 48, which includes two substantially vertical columns 50 located on each side of the conveyor system and spaced longitudinally therealong with the columns on the opposite sides of the conveyor being laterally aligned. The columns 50 extend upwardly above the upper supplemental press member 47 and are tied together at their upper and lower ends by horizontal beams 51 and 52 extending longitudinally and transversely of the conveyor, respectively, and secured at their opposite ends to the aligned columns 50 to form a rigid box-like structure. A base member 53 extends between the upright columns 50 for supporting the primary press member 46 and associated parts. The supplemental press member 47 is mounted above conveyor rolls 45 while the primary press member 46 is located below the conveyor rolls 45 and mounted on a carriage 55 for vertical reciprocal movement toward and away from the supplemental press member 47.

The carriage 55 is supported by a pair of guide members 49 (FIG. 2) and vertically movable by a fluid actuator 54 mounted on base member 53 and having a suitable piston rod 56 for raising and lowering the primary press member 46 between its lower position beneath conveyor rolls 45 and its upper position thereabove for lifting a heat-softened glass sheet S from the conveyor rolls 45 to form the same into the desired shape. After bending, piston rod 56 is retracted to lower the primary press member 46 below conveyor rolls 45, depositing the bent sheet thereon for advancement into the tempering station 33.

A pair of laterally spaced locator stops 57 are positioned in the path of movement of the advancing glass sheets to interrupt movement thereof and accurately position the same in the desired location relative to the primary press member 46. Each stop 57 is secured to the distal end of a piston rod 58 of a fluid actuating cylinder 59 mounted on the carriage 55. The cylinders 59 are operative to raise and lower the stops 57 between an upper position above conveyor rolls 45 in the path of movement of the glass sheets S and a lower position therebeneath.

Figure 3:
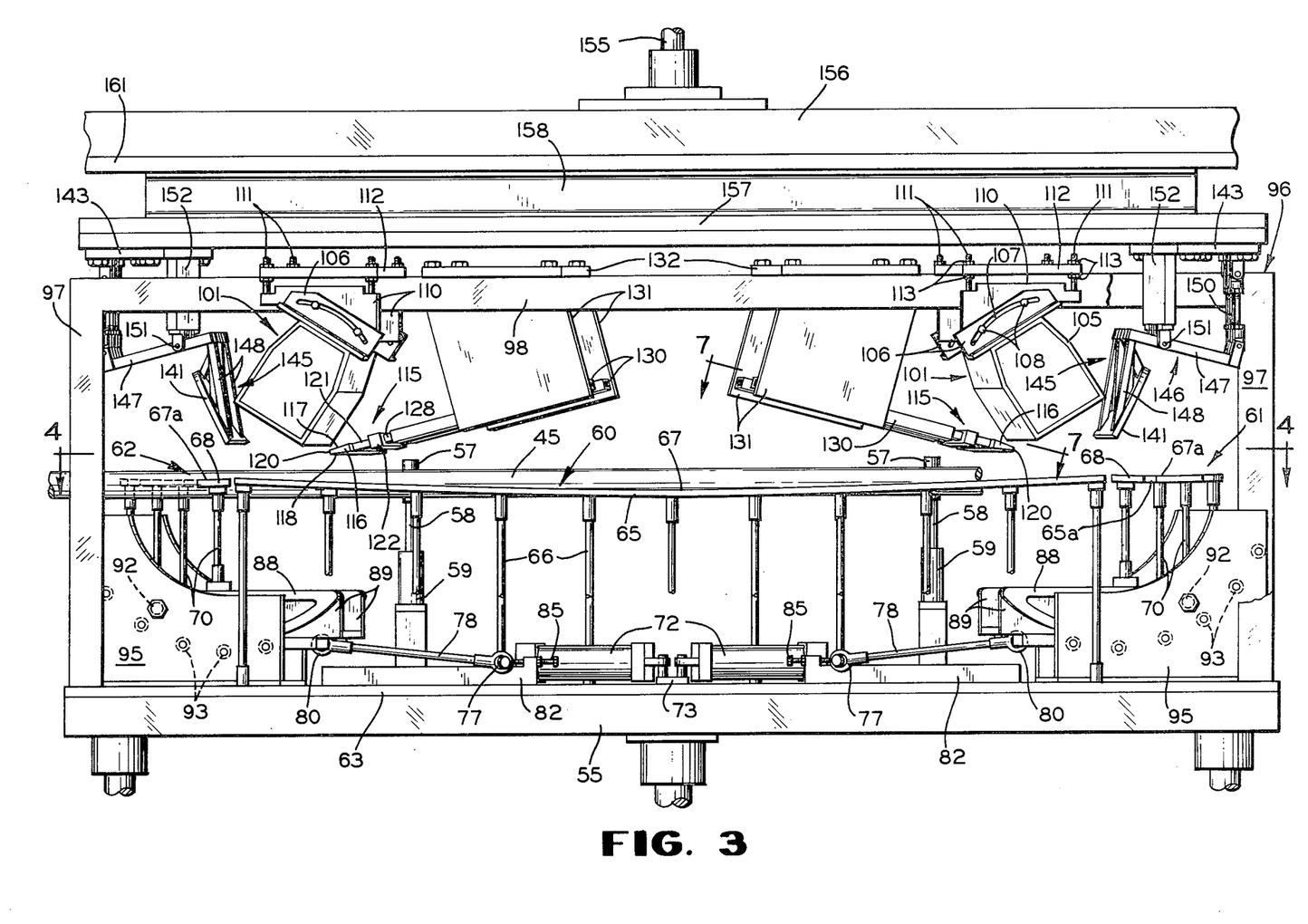
FIG. 3 is a front elevational view, on an enlarged scale, looking in the direction of arrows 3—3 of FIG. 2, showing one form of bending apparatus constructed in accordance with this invention.
Figure 4:
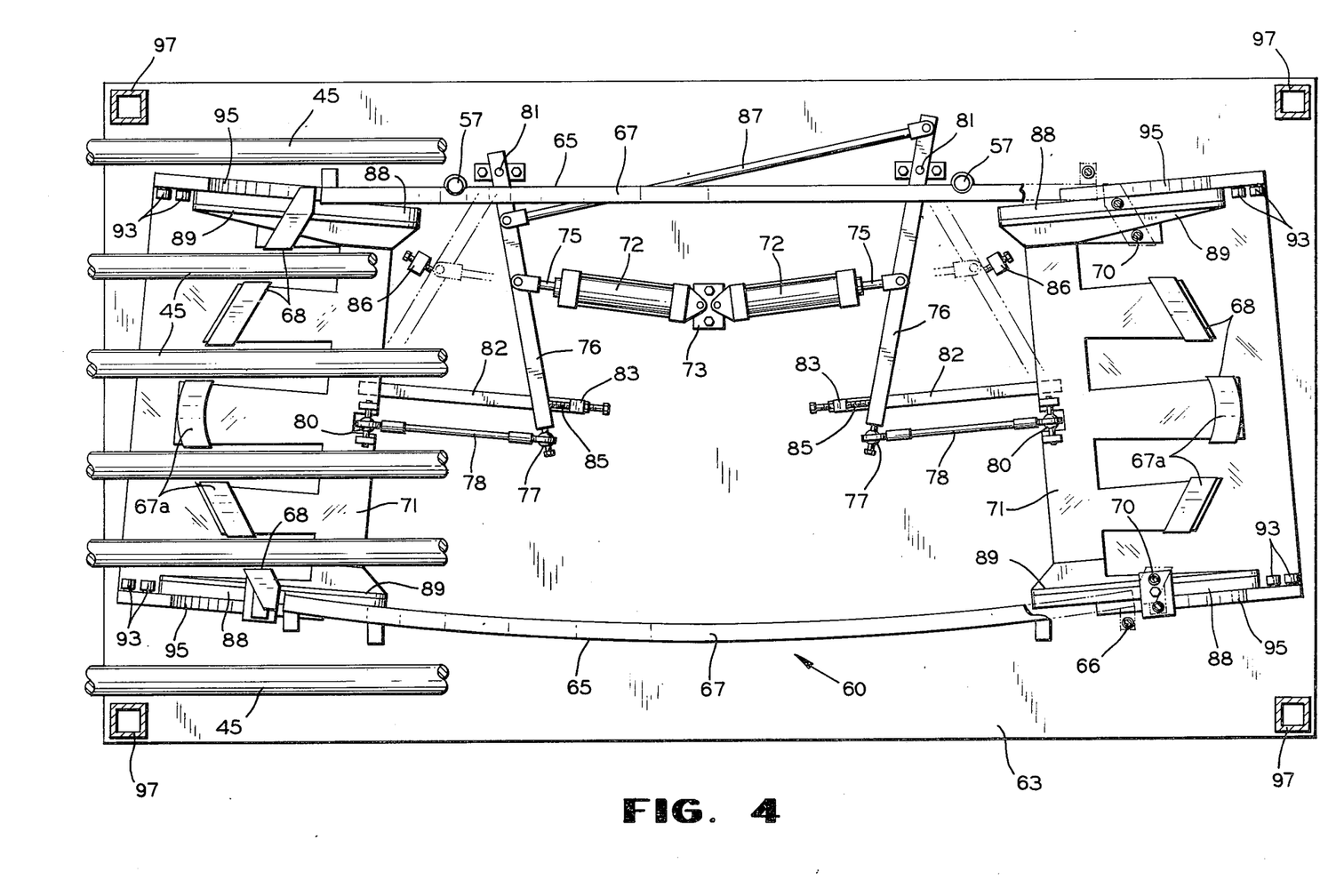
FIG. 4 is a horizontal sectional view, taken along the line 4—4 of FIG. 3.

Referring to FIGS. 3 and 4, the primary press member 46 comprises a central, main body section 60 and a pair of opposite, articulated end sections 61 and 62 mounted for pivotal movement relative to the main body section 60 between a lower glass receiving position and an upper press bending position. The main body section 60 comprises a base plate 63 secured to carriage 55 and a shaping rail 65 connected to the base plate 63 in spaced relation thereto via a series of connecting rods 66. The shaping rail 65 conforms to the width of the glass sheets to be bent and is provided on its upper face with a generally concave shaping surface 67.

The press end sections 61 and 62 are substantially identical and mirror images of each other, and each comprises a shaping rail 65a having an upper shaping surface 67a forming a continuation of the shaping surface of the main body section 60. The shaping rails 65 and 65a together conform in outline to the peripheral outline of the glass sheets to be bent. To permit displacement of the shaping rails 65a above the level of conveyor rolls 45 for lifting the glass sheets S thereabove in effecting the desired bend, shaping rails 65a are formed of a plurality of segments 68 (FIGS. 4 and 5) extending generally transversely of conveyor rolls 45 and spaced apart from each other a sufficient distance to pass between adjacent rolls 45 when raised and lowered. As mentioned earlier, the diameter of rolls 45 are formed of a relatively small diameter for the purpose of providing maximum clearance therebetween for the passage of segments 68 therethrough.

The segments 68 constituting shaping rail 65a are connected via suitable connecting rods 70 to a specially configured, movable base plate 71 and the parts formed thereon. The plates 71 are mounted for swinging movement in arcuate paths toward and away from each other relative to the main body section 60 by means of fluid cylinders 72 pivotally mounted at their head ends to a common anchor block 73 secured to the mold base plate 63. Each cylinder 72 is provided with the usual piston having a piston rod 75 pivotally connected to a movable cross bar 76. The inner end of cross bar 76 is connected by a universal joint 77 to a connecting rod 78, in turn connected by a universal joint 80 to the movable base plate 71. Each cross bar 76 is pivotally mounted adjacent one end about an upstanding pin 81 and slidable adjacent the other end along an elongated slide bar 82. Each bar 82 is formed with an upstanding end 83 provided with an adjustable screw stop 85 for limiting movement of the cross bar 76 and thereby the associated end section inwardly toward the main body section 60. A second adjustable stop 86, mounted on the primary press base plate 63, limits outward movement of the cross bar 76 and thereby the upper position of the associated press end section. The spaced cross bars 76 are connected together for movement in unison in opposite directions by a tie rod 87.

Figure 5:
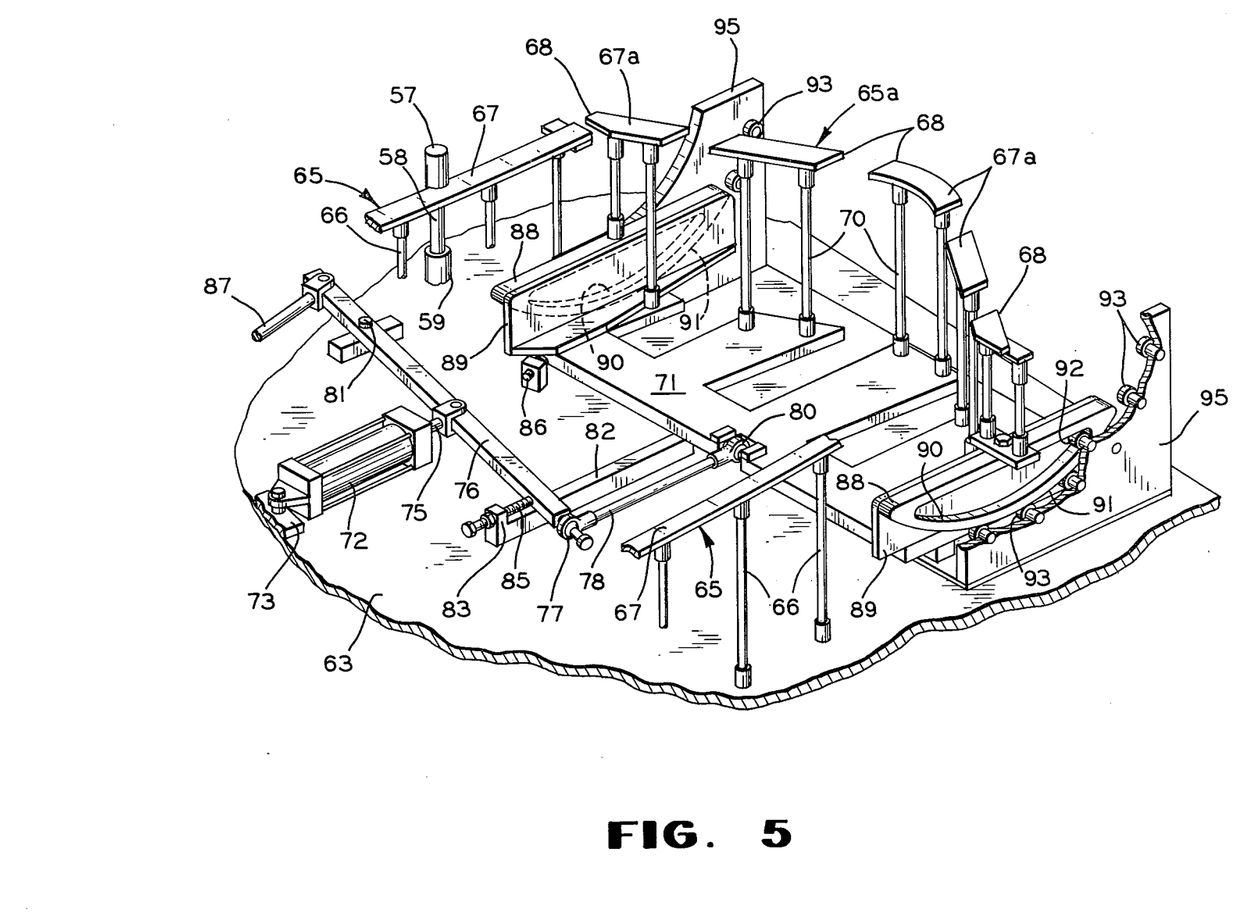
FIG. 5 is a fragmentary perspective view, showing details of one articulated, press end section.

Means are provided for guiding the press end sections 61, 62 in their arcuate movements, such guide means comprising a cam track 88 rigidly secured to an upright bracket 89 affixed to each side of the movable base plate 71. As best shown in FIG. 5, each cam track 88 is formed with an inner cam surface 90 and an outer cam surface 91 adapted to ride on an inner roller 92 and a series of outer rollers 93, respectively, journalled for rotation in an upright mounting plate 95 located adjacent to and outwardly of the associated bracket 89.

The primary press base plate 63 forms the base plate of a secondary frame 96 (FIG. 2) mounted on carriage 55 and which includes four corner posts 97 connected at their upper ends by longitudinally and transversely extending structural members 98 and 100, respectively, to form a generally box-like framework for supporting various components located above the primary press proper, as will presently be described.

As is commonly known, glass must be heated to its softening point before it can be effectively bent or shaped. In order to effect a relatively sharp or V-shaped bend in a glass sheet, it has been found necessary to intensify or augment the temperature of the glass along the line of sharp bend well above the softening point thereof or that temperature normally required for imparting gradual curved bends thereto. Moreover, it is important to concentrate or localize the additional heat along the desired line of bend to assure a sharp, angular bend therealong. To this end, radiant heaters 101 are mounted on the superstructure of frame 96 above the shaping rail 65 in spaced relation thereto. The specific radiant heaters incorporated and used successfully in the apparatus of the present invention are of the type known as "Dual Line Heaters" marketed by Research, Inc. of Minneapolis, Minn.

Figure 6:
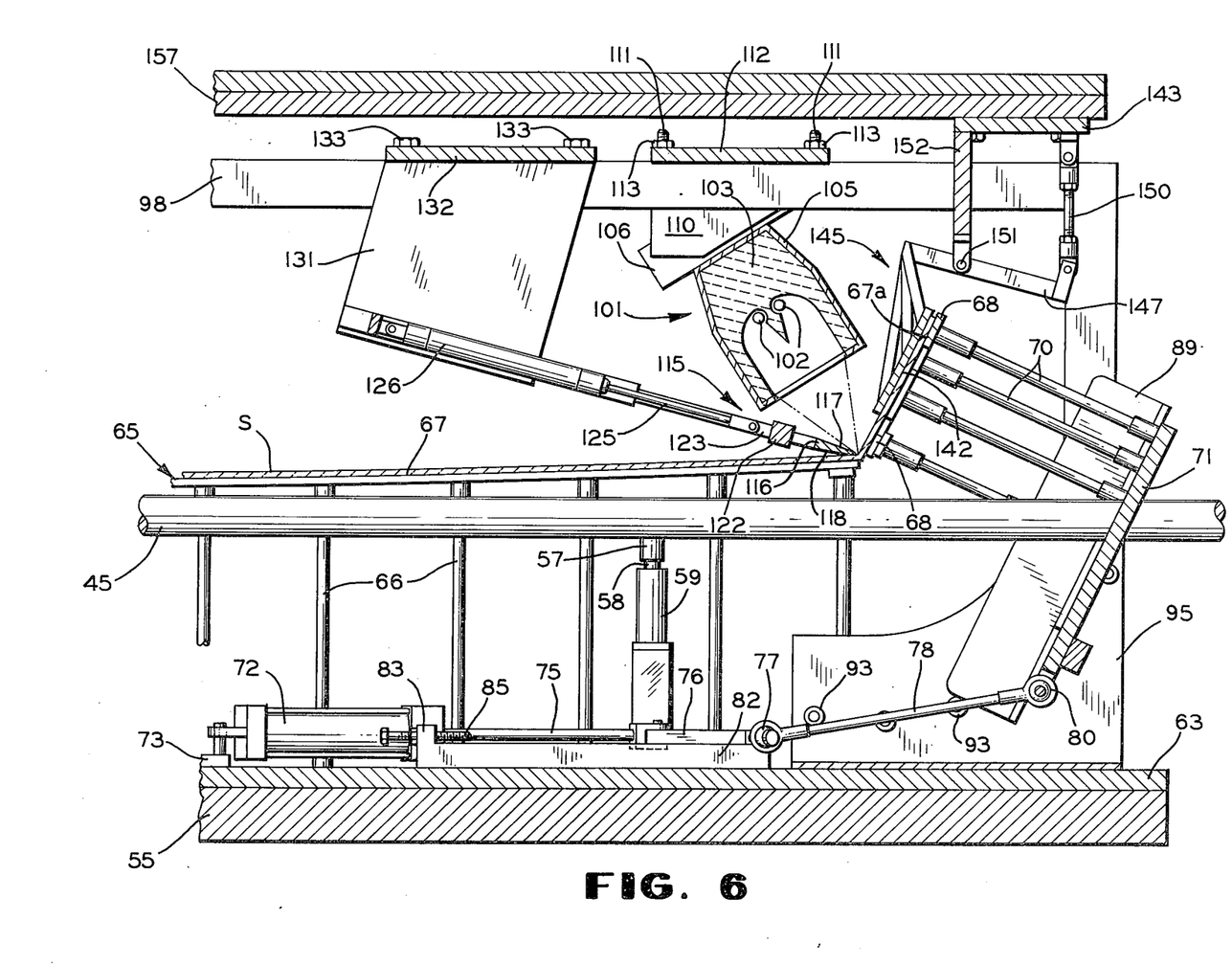
FIG. 6 is a fragmentary vertical sectional view of the press end section shown in FIG. 5.

As best shown in FIG. 6, each heater 101 comprises a pair of quartz filament lamps 102 forming radiant heat emitter sources mounted in spaced relation within an eliptical, water cooled, aluminum reflector 103 for focusing the radiant energy emitted from the filament lamps 102 onto a narrow line target or focal line of the glass sheet along the line about which the sheet is intended to be bent. The lamps 102 and reflector 103 are encased within a suitable housing 105 extending generally transversely of the primary press proper and parallel to the line about which the glass sheet is to be bent.

The means for mounting each heater 101 on frame 96 includes a pair of spaced angle members 106 (FIG. 3) welded or otherwise fixedly secured to the upper end of the heater housing 105 adjacent the opposite ends thereof and provided with arcuate slots 107 for receiving suitable fasteners 108 therethrough for attachment to mounting brackets 110. Each mounting bracket 110 is provided with threaded studs 111 projecting upwardly through suitable openings formed in a mounting plate 112 extending transversely across and supported on the longitudinal structural members 98 of the frame 96. The heater 101 can be vertically adjusted relative to the underlying shaping rail 65 by means of the threaded studs 111 and then fixed in the selected adjusted position by suitable lock nuts 113. Also, each heater 101 is angularly adjustable by means of the slot 107-fastener 108 arrangement and can be adjusted in its transverse direction by orienting the mounting plate 112 in various angular positions relative to longitudinal members 98. This series of adjustments is dictated by the height of the shaping rail 65 and the location and direction of the desired lines about which the glass sheet is to be bent.

Figure 7:
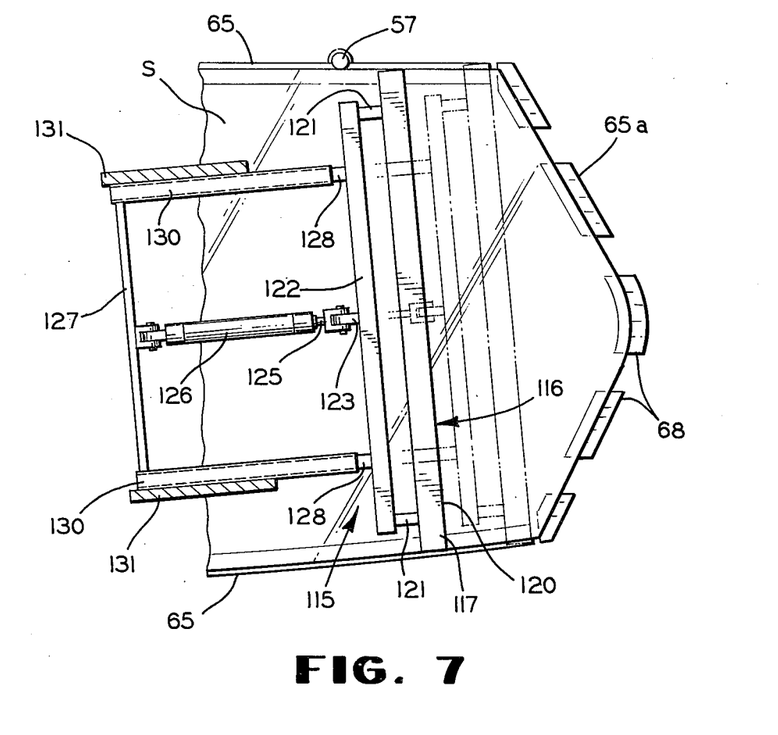
FIG. 7 is a sectional view, taken along the line 7—7 of FIG. 3, showing in plan the bending tool assembly used in conjunction with this invention.

In order to facilitate the formation of the sharp angular bends in the glass sheets, reciprocal bending tools, generally designated 115, are employed in conjunction with the articulated end sections 61 and 62. As best shown in FIGS. 6 and 7, each bending tool 115 comprises a transversely extending brake bar 116 having a generally triangular configuration in cross-section with opposed tapered surfaces 117 and 118 converging toward a glass engaging blunt edge 120. The brake bar 116 can be covered with an asbestos or fiberglass material to provide a somewhat resiliently yieldable, heat resistant, non-marring surface about which the glass sheets are bent.

It may sometimes be desirable to heat the brake bars 116 to reduce the temperature differential between the latter and the superheated portions of the glass sheet. In such event, each of the brake bars 116 can be provided with an internal bore or cavity for accommodating a suitable electrical resistance heating element suitably connected to a source of electrical power. Thus, the brake bars 116 can be heated to any desired temperature for precluding thermal shock to the glass sheet upon contact therewith by the brake bars.

Each brake bar 116 is connected by spacer members 121 to a support bar 122 extending in the same direction as the former in substantial parallelism therewith. The support bar 122 is provided with a lug 123 connected to the piston rod 125 of a fluid cylinder 126 attached to a cross bar 127. Cylinder 126 is operative to extend and retract brake bar 116 between a glass engaging position shown in dotted lines and a position of rest shown in full lines in FIG. 7.

Means are provided for guiding the cantilevered brake bar 116 between the extended and retracted positions, such means including a pair of slide rods 128 connected to and extending normal to support bar 122 at spaced points on opposite sides of the piston rod connection. These slide rods 128 are guided for axial movement in guide channels 130 connected at their rearward ends to the cross bar 127. It should be noted that each brake bar 116 is oriented parallel to the focal line of the associated radiant heater 101 or the line about which the sheet is to be bent. In the present embodiment, this requires the brake bars 116 to extend at slight angles relative to a horizontal line extending normal to the axes of conveyor rolls 45. Also, the path of reciprocal travel of each brake bar 116 extends slightly downwardly from a true horizontal plane, as viewed in FIGS. 3 and 6.

The means for mounting each bending tool assembly 115 on frame 96 includes a pair of laterally spaced, vertically extending plates 131 welded or otherwise fixedly secured at their lower ends to guide channels 130. The plates 131 in turn are rigidly secured at their upper ends to a mounting plate 132 extending transversely of and secured on the longitudinal members 98 of frame 96 by suitable fasteners 133.

Figure 9:
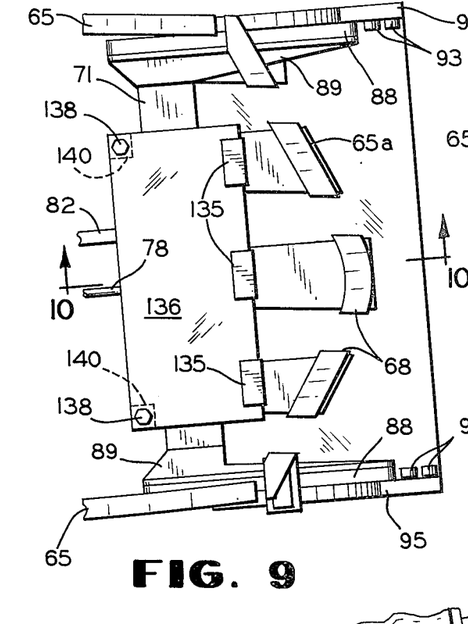
FIG. 9 is a fragmentary, top plan view, showing the auxiliary glass supporting segments used in conjunction with this invention.
Figure 10:
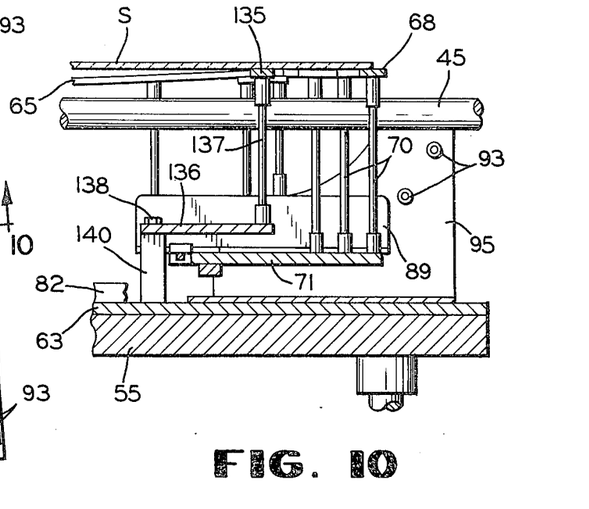
FIG. 10 is a vertical sectional view, taken along the line 10—10 of FIG. 9.

It has been found desirable to support the heat-softened glass sheet adjacent the lines of sharp bend during the bending operation to preclude excessive sagging thereof in these regions. To this end, a series of transversely spaced, auxiliary segments 135 (FIGS. 9 and 10) is provided in the primary press member 46 along a line substantially parallel to the line of bend. These auxiliary segments 135 are disposed in substantially the same horizontal plane as the segments 68 of the articulated end sections 61 and 62 and are connected to a cantilevered base plate 136 by means of connecting rods 137. The base plate 136 is secured adjacent its opposite ends by suitable fasteners 138 to a pair of upstanding mounting blocks 140 welded or otherwise fixedly secured to the primary press member base plate 63.

As will hereinafter be described in greater detail, the bending of the heat-softened glass sheet is effected by the raising of the primary press member 46 above conveyor rolls 45 to lift the sheet therefrom. As the sheet S is moved bodily upwardly by press member 46, inertia forces acting on the glass cause it to sag. Once the sagging action has started, natural gravitational forces acting thereon are generally sufficient to cause the heat-softened sheet to bend and assume the contour of the shaping surfaces 67 and 67a. When the primary press member 46 reaches the end of its upstroke, the brake bar 116 is extended into engagement with the sheet S along the superheated focal line about which the sheet is to be sharply bent and the press end sections 61 and 62 are actuated to swing upwardly and sharply bend the sheet end portions about brake bar edges 120 to form the end or rear portions 23 of the finished product.

In most cases, the above described procedure is adequate to completely form a sheet to the desired sharply bent configuration. In some situations, however, the desired curvature in the bent end portions 23 may be sufficiently pronounced such that inertia and gravity forces alone are not sufficient to cause the sheet to bend into conformity with the shaping surfaces 67a, particularly since the latter are raised into an upright, near vertical position upon actuation of the articulated press end sections 61 and 62. There is a tendency for the marginal edges of these glass end portions 23 to be slightly displaced away from the shaping surfaces 67a as the same are rapidly swung upwardly during the formation of such end portions. While generally these marginal end portions will sag back against and into conformity with the shaping surfaces 67a, this may not always occur, especially when compound curves are to be formed in these end portions.

Figure 8:
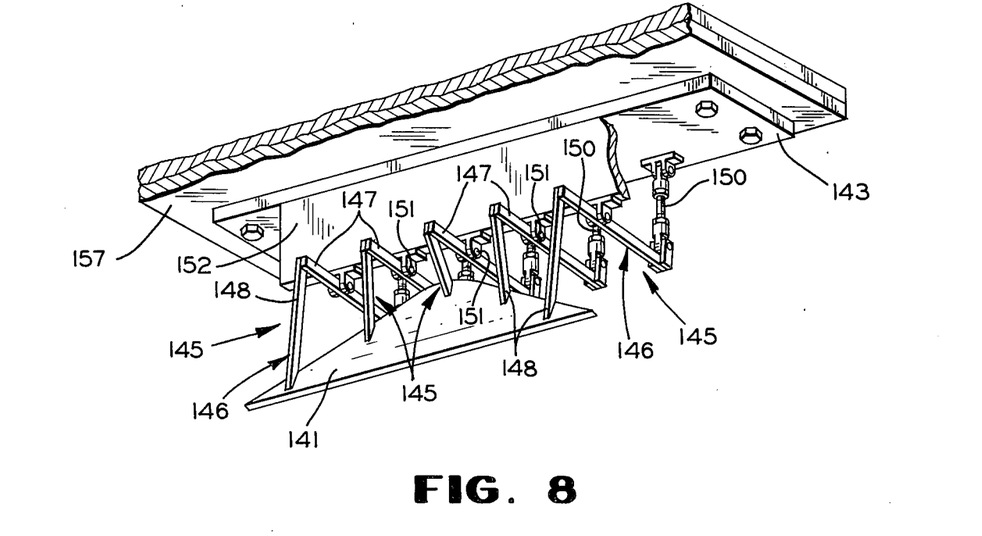
FIG. 8 is a fragmentary perspective view, showing details of the supplemental press member.

Accordingly, in accordance with this invention, there is provided a secondary or supplemental upper press member 47 which is aligned with the lower primary press member 46 and has a pair of shaping elements 141 engagable only with the end portions 23 of the sheet being bent. The shaping elements 141 have outline configurations conforming to the shape of the glass sheet end portions and shaping surfaces 142 complementary to the shaping surfaces 67a of the articulated end sections. Each shaping element 141 is suspended from a horizontal base member 143 by a series of connecting members 145, each comprised of a link 146 having angularly related legs 147 and 148 and an axially adjustable connecting rod 150. The horizontally extending leg 147 of each link is pivotally mounted, as shown at 151 in FIG. 8, to a vertical plate 152 rigidly secured to and extending downwardly from the base member 143. The adjustability of the threaded connecting rods 150 and the pivotal linkage attached thereto render the shaping elements 141 adjustable to accommodate glass sheet end portions bent to various angular attitudes.

The means for supporting the supplemental press member 47 includes a fluid cylinder 153 mounted on an upper horizontal beam 51 and having the usual reciprocable piston (not shown) provided with a piston rod 155 connected at its outer end to a vertically movable platen 156. The base member 143 supporting the shaping elements 141 is secured to the lower surface of a structural plate 157, in turn connected to the platen 156 by means of interconnected structural members 158 and 160 and a support plate 161. A plurality of guide posts 162 are connected at their lower ends to the four corners of platen 156, respectively, and extend upwardly through suitable bushings 163 mounted on upper horizontal beams 52 for sliding movement relative thereto to properly guide platen 156 during its vertical movement. Although the supplemental press member 46 is mounted for vertical reciprocable movement as described above, it is generally held in a stationary position while the primary press member 46 is moved upwardly relative thereto during a glass bending operation. Of course, the supplemental press member 47 may be vertically moved to any selective adjusted position, as desired or required.

As hereinbefore mentioned, each brake bar 116 assists the articulated primary press member 46 in forming a sharp bend in a heat-softened glass sheet along a narrow, superheated line about which it is desired to bend the sheet. Additionally, the brake bar 116 assists in holding the glass sheet down against the shaping rails 67, 67a during the bending operation and precludes sliding movement of the glass sheet on shaping surface 67. While preferably the brake bar 116 is employed in the apparatus of the present invention to consistently assure the formation of sharp bends in a series; of glass sheets in a mass production operation, the bending apparatus can be utilized without the use of the brake bar to impart sharp bends to a sheet of glass. Also, the brake bar 116 can be disabled when it is desirable to form rounded or curved bends of relatively small radii in the glass sheet. In either event, provision is made to maintain the heat-softened glass sheet in contact against the shaping rail 67 to counteract the tendency of the glass sheet, particularly those opposite marginal edge portions adjacent the line about which the glass is to be bent, to move upwardly away from the shaping rail 67 when the articulated end sections 61 and 62 are actuated during the bending operation. To this end, a pair of glass clamping or holding mechanisms, generally designated 165, are provided on opposite sides of the primary press member 46 adjacent each end of the main body section 60 for engaging and holding the opposite marginal edge portions of the glass sheet S against shaping surface 67.

Figures 11, 12:
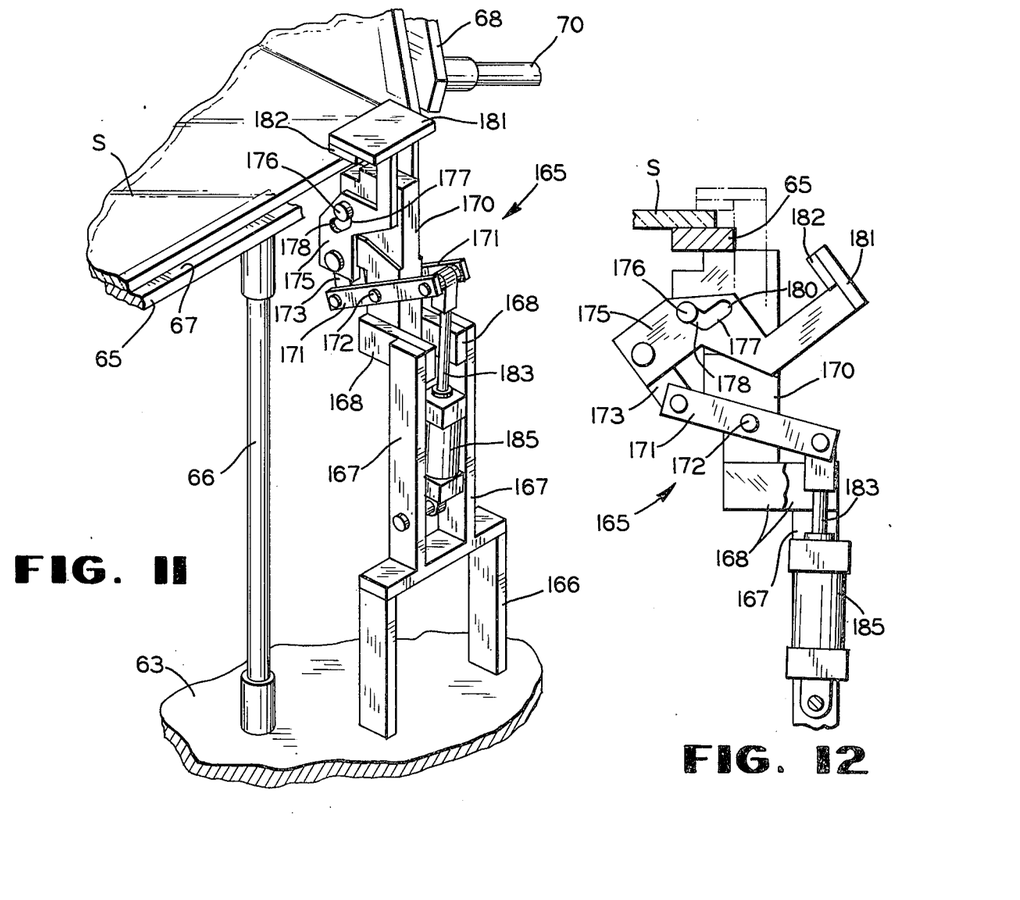
FIG. 11 is a fragmentary perspective view of a glass sheet clamping mechanism used in conjunction with this invention.
FIG. 12 is a fragmentary front elevational view, enlarged and partly in section, of the clamping mechanism of FIG. 11.

As best shown in FIGS. 11 and 12, each glass holding mechanism 165 comprises a generally inverted U-shaped base member 166 rigidly secured to the primary press member base plate 63 and provided with laterally spaced, upstanding legs 167. A pair of right angularly related brackets 168 are fixedly secured to the upper ends of legs 167 for supporting an upright support block 170 therebetween. A pair of actuating levers 171 are pivotally mounted on block 170 via pins 172 projecting laterally outwardly therefrom and are connected to the lower end of a pair of brackets 175. The brackets 175 are connected to the opposite sides of block 170 by means of pins 176 extending through specially configurated slots 177 formed in the brackets 175. Each slot 177 is formed to provide angularly related portions 178 and 180 for a purpose that will hereinafter become apparent. The upper ends of brackets 175 are provided with a clamping foot 181 having a pad 182 on the underside thereof adapted to engage the upper surface of a glass sheet and clamp the same against the shaping surface 67 adjacent the line of transverse bend. Pad 182 preferably is formed of asbestos or fiberglass material to provide a resiliently yieldable, heat resistant non-marring surface in contact with the heat-softened glass sheets.

The other ends of the actuating levers 171 are connected to the piston rod 183 of a fluid actuator 185 located between the legs 167 of member 166 and pivotably connected at its head end thereto. Extension of the piston rod 183 swings levers 171 in a counterclockwise direction, as viewed in FIG. 12, causing the interconnected brackets 175 first to swing in the same direction in an arcuate path about pivot pins 176 and be simultaneously translated inwardly toward the shaping rail 65, via slot portion 178, until clamping foot 181 reaches a position above the marginal edge portions of glass sheet S. Continued extension of piston rod 183 then causes the bracket 175 to move downwardly, via now vertically oriented slot portion 180, to bring the clamping foot 181 downwardly into clamping engagement against the glass sheet marginal edge portions. While these clamping mechanisms 165, located adjacent the four corners, respectively, of the press member main body section 60, preferably are employed when the brake bars 116 are disabled, it should be understood that they can be utilized in conjunction therewith, if desired, within the purview of this invention.

The mode of operation of the apparatus of this invention in bending one sheet of glass is as follows:

A flat glass sheet S is loaded onto the conveyor rolls 42 at the entrance end (not shown) of the furnace 31 for movement through the heating chamber 41 wherein the sheet is heated throughout to substantially its softening point or bending temperature. This heated sheet passes through the opening 43 and is transferred onto conveyor rolls 45 for movement into the bending station 32 between the press members 46 and 47.

As the sheet S enters the bending station 32, a photoelectric cell or other suitable detection device (not shown) activates a timer controlling the speed of conveyor rolls 45 to decrease the speed thereof and also completes a circuit to step-up the voltage to filament lamps 102 of the spaced heaters 101 to rapidly heat the same. This occurs as the heat-softened sheet is advanced between the press members 46 and 47 and just prior to the leading edge of the sheet engaging the stops 57. The sheet is accurately located relative to the press members 46 and 47 when the leading edge thereof engages the stops 57. Also, the radiant heat emitted from the lamp sources 102 is then accurately oriented onto the glass sheet along narrow line targets or focal lines coincidental with the lines about which it is desired to bend the sheet. This concentrated radiant heat energy is absorbed by the glass sheet along these desired lines of bend to superheat the same substantially above the softening point or bending temperature of the remaining portions of the glass sheet.

The same detection device or, if desired, another slightly downstream thereof, initiates actuation of another timer (not shown) controlling operation of the bending cycle. The timing of this latter control is such that cylinder 54 is actuated to raise the primary press member 46 upwardly to remove the sheet S from the conveyor rolls 45 just about the time the leading edge of the sheet engages stops 57. Since the primary press member 46 and the superstructure supporting heaters 101 are mounted on the carriage 55, the distance or spacing between the heaters 101 and the sheet supported on the shaping rails 65, 65a remains constant during primary press movement to accurately maintain the focal lines fixed at their desired positions on the glass sheet.

As the primary press member 46 continues to move upwardly, the combined effects of inertial and gravitational forces cause the glass sheet to sag into conformity with the shaping surfaces 67, 67a of the primary press member 46. The primary press member 46 continues upwardly until it reaches the end of its upstroke or the "upper dwell" position and engages a suitable limit switch (not shown) to activate another timer (also not shown) to continue sequential operation of the bending cycle. During the upstroke of the primary member 46, the cylinders 57 are actuated to retract the locator stops 57 and permit advancement of the bent sheet when subsequently returned to conveyor rolls 45.

When the primary press member 46 reaches its "upper dwell" position, cylinders 126 are actuated to extend their respective brake bars 116 into engagement with the sheet S along the spaced focal lines about which it is desired to bend the sheet. At the same time, cylinders 72 are actuated to pivot their respective cross bars 76 and swing the articulated press end sections 61 and 62 upwardly to sharply bend the glass end portions 23 about brake bars 116 and press these portions 23 against the shaping surfaces 142 of the supplemental press shaping elements 141, thereby forming sheet S into the desired shape. In addition to assisting in the formation of the sharp bends, the brake bars 116 also serve to hold the heat-softened sheet against the shaping rail 65 and preclude sliding movement of the sheet thereon which might otherwise occur if the articulated end sections 61 and 62 were not synchronously activated at precisely the same time.

While, as pointed out above, the combined forces of inertia end gravity will ordinarily be sufficient to cause the sheet to conform to the shaping surface 67a of the articulated sections 61 and 62, as well as the shaping surface 67 of the main body section 60, the shaping elements 141 of the supplemental press member 47 will insure that the end portions 23 of the sheet will always be pressed against and into conformity with the shaping surfaces 67a of the articulated end sections 61 and 62.

At the end of the dwell period in which the glass sheet S is formed into its final configuration, the last mentioned timer times out to step down the voltage applied to the lamps 102 and decrease the heat generated thereby. Also, the articulated end sections 61 and 62 are swung downwardly and returned to their normal, generally horizontal dispositions and the brake bars 116 are retracted to their glass disengaging, rest positions. The primary press member 46 is then lowered below conveyor rolls 45 to deposit the sharply bent sheet thereon. The rolls 45 receive the bent sheet and advance the same out of the bending station 32 and onto a third series of conveyor rolls 186, also a part of the conveyor system 28, which continue to advance the bent sheet along the path of movement into and through the tempering station 33.

The chilling means 35 in tempering station 33 comprises upper and lower blastheads 187 and 188 disposed above and below the path of movement of the glass sheets and connected to a source (not shown) of cooling fluid, such as air for example. The blastheads 187 and 188 are provided with a plurality of transversely extending sections 190, each of which is formed with a plenum chamber 191 having a plurality of tubes 192 for discharging streams of cooling air against the opposite surfaces of the bent sheets moving along the path on conveyor rolls 186. The bent sheets are advanced between the blastheads at a speed promoting a proper rate of cooling to obtain a quality temper in the sheets.

Actuation of cylinders 54, 59, 72 and 126 is effected by conventional fluid control valves (not shown). Proper sequencing of the operation of the several control valves, as well as the variation of speeds imparted to the several series of conveyor rolls 42, 45 and 186, for effecting the foregoing operations in a cyclic, timed relationship is effected by conventional limit switches and/or by conventional timers incorporated in the electrical control system. Each of these switches and/or timers trigger subsequent stages of operation of the various actuators and conveyor roll drives and since such sequentially operable switches and timing arrangements are known, and, per se, form no part of the present invention, no detailed description or further amplification is believed necessary.

While the above operation was described in a manner utilizing the brake bars 116 to produce sharp, angular bends in a glass sheet, it should be understood that the use of the brake bars is not always necessary and that the method and apparatus of this invention can be practiced and utilized without such brake bars, if desired. This is especially so when it is desired to form bends having relatively small radii of curvatures. When the brake bars are disabled or not utilized, it is advisable to employ the clamping mechanisms 165, one at each corner of the primary press main body section 60. The operation of the apparatus when utilizing the clamping mechanisms 165 would be similar to that described above except that the clamping mechanisms 165 would be activated in place of the brake bars just prior to actuation of the articulated end sections 61 and 62. Of course, the clamping mechanisms 165 can be used in conjunction with the brake bars if desired, and would be activated about the same time or, just prior to, actuation of the brake bars.

From the foregoing, it is apparent that the objects of the invention have been fully accomplished. An improved method and apparatus is provided for bending glass sheets to relatively sharp angles in a press bending operation. The articulated end sections of the primary press member, together with the means for superheating selective portions of the glass sheet along intended lines of bend, assist in forming sharp angular bends in a glass sheet. The provision of auxiliary braking bars and glass clamping mechanisms used in conjunction with, or in lieu of, each other, offer versatality in selectively forming the glass sheets with relatively sharp bends, curved bends, or any combination of the two into complex configurations that were heretofore virtually impossible to produce. By the provision of the supplemental press member, selected portions of the glass sheet can be bent into a wide variety of complex or compound shapes, as desired.

It is to be understood that the form of the invention herewith shown and described is to be taken as an illustrative embodiment only of the same, and that various changes in the shape, size and arrangement of parts, as well as various procedural changes, may be restored to without departing from the spirit of the invention.

We claim:

1. A method of bending a glass sheet comprising: heating a glass sheet substantially to the softening point thereof, supporting said heat-softened sheet on a press member having a shaping surface, superheating the heat-softened sheet along a line about which it is desired to sharply bend the sheet, and holding said sheet adjacent said line against said shaping surface while applying a bending moment to a portion of the glass sheet to bend such portion about said line.

2. A method according to claim 1, wherein said superheating is effected by focusing radiant heat energy onto said glass sheet along a narrow line coincident with the line about which the sheet is intended to be bent.

3. A method according to claim 1, including pressing said portion of said glass sheet into conformity with said shaping surface after bending said portion about said line.

4. A method according to claim 1, wherein said sheet is held against said shaping surface by clamping said sheet thereagainst at spaced points adjacent said line about which said glass sheet is intended to be bent.

5. A method according to claim 1, including positioning said heat-softened sheet in a substantially horizontal plane above said shaping surface, said shaping surface having a main portion and at least one pivotal portion, moving said shaping surface upwardly through said plane to lift said sheet bodily from said plane and promote an inertial force which when combined with the force of gravity initiates the shaping of said sheet into conformity with at least said main portion shaping surface, and swinging said pivotal portion shaping surface relative to said main portion shaping surface to apply said bending moment.

6. A method according to claim 5, including urging the upper surface of said bent glass sheet portion against a supplemental shaping surface in spaced relation and complemental to said pivotal portion shaping surface to press said glass sheet portion therebetween into conformity therewith.

7. A method according to claim 1, wherein said heat-softened sheet is superheated uniformly along the entire length of said line about which it is desired to sharply bend the sheet.

8. A method of bending a glass sheet comprising: heating a glass sheet substantially to the softening point thereof, superheating the heat-softened sheet along a line about which it is desired to bend the sheet, applying a bending moment to a portion of the glass sheet to bend such portion about said line, supporting said heat-softened sheet on a press member having an upwardly facing shaping surface prior to superheating the same, and holding said glass sheet against said shaping surface when applying said bending moment to said glass portion, said sheet being held against said shaping surface by engaging the opposite surface of said glass sheet with a bending tool contacting said opposite surface along the line about which the sheet is intended to be bent.

9. A method of bending a glass sheet comprising: heating a glass sheet substantially to the softening point thereof, superheating the heat-softened sheet along a line about which it is desired to bend the sheet, applying a bending moment to a portion of the glass sheet to bend such portion about said line, supporting said heat-softened sheet in a substantially horizontal plane above a shaping surface having a main portion and at least one pivotal portion, moving said shaping surface upwardly through said plane to lift said sheet bodily from said plane and promote an inertial force which when combined with the force of gravity initiates the shaping of said sheet into conformity with at least said main portion shaping surface, and swinging said pivotal portion shaping surface relative to said main portion shaping surface to apply said bending moment, said superheating being effected by focusing radiant heat energy onto said glass sheet along a narrow line coincident with the line about which the sheet is intended to be bent.

10. Apparatus for bending glass sheets comprising: means for heating a glass sheet substantially to the softening point thereof, means for superheating the heat-softened sheet substantially above the softening point thereof along a line about which it is desired to sharply bend the sheet, means including a shaping surface for bending said sheet, means for holding the major portion of said sheet against said shaping surface, said bending means including means engageable with a portion of said glass sheet for applying a bending moment thereto to bend such portion about said line relative to said held major portion of said sheet.

11. Apparatus for bending glass sheets comprising: a frame, a press member mounted on said frame and having an upwardly facing shaping surface thereon for supporting a heat-softened sheet of glass, said press member having a main body section and at least one articulated section mounted for pivotable movement relative to said main body section, means on said frame and spaced from said press member for heating said glass sheet along at least one desired line of bend to a temperature above the heat-softened temperature of the glass, means for holding said glass sheet adjacent said line against said main body section shaping surface, and power means for moving said articulated section relative to said main body section to bend said glass sheet about said line.

12. Apparatus according to claim 11, including means for supporting the heat-softened glass sheet in position above said shaping surface, means for moving said press member upwardly prior to actuation of said articulated section to lift said sheet bodily from said supporting means thereby creating combined inertial and gravitational forces to initiate the bending of said sheet into conformity with at least said main body section shaping surface.

13. Apparatus according to claim 12, wherein said means supporting said heat-softened glass sheet above said shaping surface comprises a roll conveyor for advancing said sheet into and out of said position before and after the bending operation.

14. Apparatus according to claim 11, wherein said press member is of ring-type configuration and said articulated section is provided with spaced shaping segments having surfaces thereon forming a part of the shaping surface.

15. Apparatus according to claim 14, including means for guiding said articulated section in an arcuate path between a glass receiving position and a glass shaping position.

16. Apparatus according to claim 15, including a secondary press member mounted on said frame in spaced relation above said first mentioned press member and provided with at least one shaping element having a shaping surface aligned with and complemental to the shaping surface of said press member articulated section.

17. Apparatus according to claim 11, wherein said heating means comprises at least one heater emitting radiant heat energy and focusing the same on said desired line of bend.

18. Apparatus according to claim 11, including a reciprocal bending tool mounted on said frame and engageable with the surface of said glass sheet opposite the surface resting on said shaping surface and along said desired line of bend.

19. Apparatus according to claim 20, wherein said bending tool comprises an elongated bar having a glass engaging edge substantially coextensive with said desired line of bend.

20. Apparatus according to claim 18, including power means for extending and retracting said bar into and out of engagement with said glass sheet and means guiding said bar for movement between said extended and retracted positions.

21. Apparatus according to claim 11, including a secondary press member spaced above said first mentioned press member and provided with at least one shaping element having a shaping surface aligned with and complemental to the shaping surface of said press member articulated section.

22. Apparatus according to claim 11, wherein said holding means comprises a plurality of clamping mechanisms for securing marginal edge portions of said glass sheet against said shaping surface.

23. Apparatus according to claim 22, wherein each of said clamping mechanisms comprises a glass engaging foot movable between a glass engaging position and a position spaced outwardly away from said shaping surface, and means for moving each of said feet between said rest position and said glass engaging position.

24. Apparatus according to claim 11, including means on said press member in spaced relation to said shaping surface for supporting said glass sheet adjacent said line of bend.

25. Apparatus according to claim 24, wherein said supporting means comprises a series of segments arranged in a row extending substantially parallel to said line of bend.

UNITED STATES PATENT AND TRADEMARK OFFICE
CERTIFICATE OF CORRECTION

PATENT NO. : 4,074,996

DATED : February 21, 1978

INVENTOR(S) : Floyd T. Hagedorn et al

It is certified that error appears in the above-identified patent and that said Letters Patent are hereby corrected as shown below:

```
Col. 2, line 8, after "is" insert --a--
Col. 9, line 8, "serie;" should be --series--
Claim 19, line 1, "20" should be --18--
Claim 20, line 1, "18" should be --19--
```

Signed and Sealed this

Twentieth Day of June 1978

[SEAL]

Attest:

RUTH C. MASON
Attesting Officer

DONALD W. BANNER
Commissioner of Patents and Trademarks